United States Patent [19]
Witt

[11] 4,431,217
[45] Feb. 14, 1984

[54] FIRE-SAFE SEAL FOR SWIVEL JOINT

[75] Inventor: Robert L. Witt, Conroe, Tex.

[73] Assignee: FMC Corporation, Chicago, Ill.

[21] Appl. No.: 329,492

[22] Filed: Dec. 10, 1981

[51] Int. Cl.³ .................... F16L 27/00; F16L 21/02; F16L 17/00

[52] U.S. Cl. .................................. 285/276; 285/379; 285/108

[58] Field of Search ............... 285/276, 281, 379, 108, 285/279

[56] References Cited

U.S. PATENT DOCUMENTS

| | | | |
|---|---|---|---|
| 1,795,867 | 3/1931 | Kuhn | 285/279 X |
| 2,558,087 | 6/1951 | Holl | 285/279 X |
| 3,301,568 | 1/1967 | Perry | 285/277 X |
| 3,408,095 | 10/1968 | Moore | 285/276 X |

Primary Examiner—Richard J. Scanlan, Jr.
Attorney, Agent, or Firm—Lloyd B. Guernsey; Walter W. Ritt, Jr.; Richard B. Megley

[57] ABSTRACT

A fire-safe seal for use in a swivel joint in a pressurized fluid system subject to fire risk, the seal having both a metal anti-extrusion ring and an annular resilient non-metallic seal member to provide essentially zero fluid linkage at normal operating temperatures, and the anti-extrusion ring to provide an extremely low rate of leakage in the event high temperature should destroy the resilient seal member. A curved spring or other metal anti-cocking device biases the anti-extrusion ring tightly against the junction of a male and a female joint to ensure that the ring remains in position after the resilient seal member is destroyed to prevent leakage through the junction.

3 Claims, 10 Drawing Figures

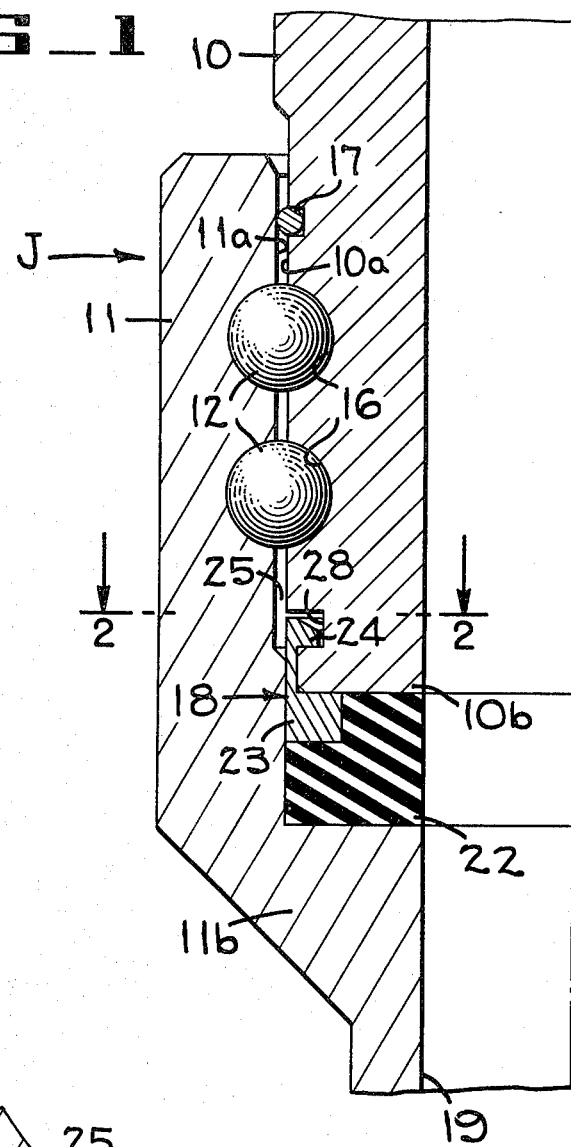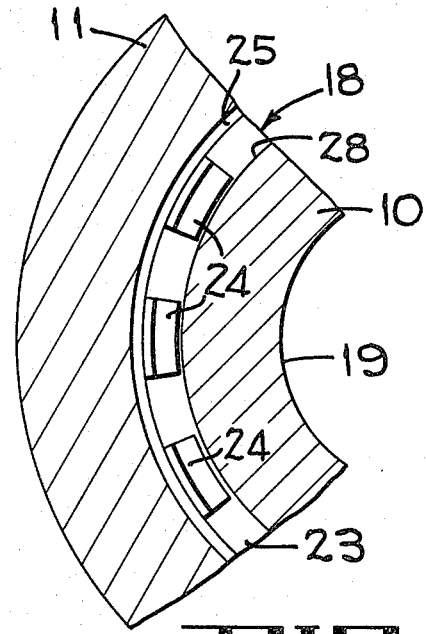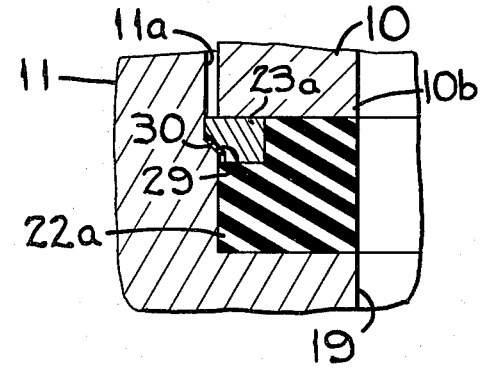

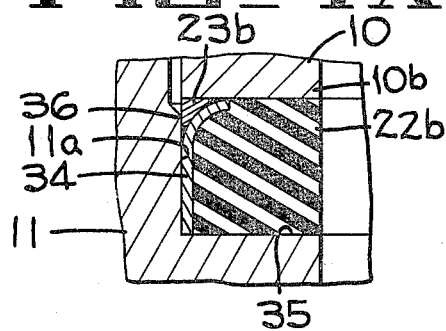
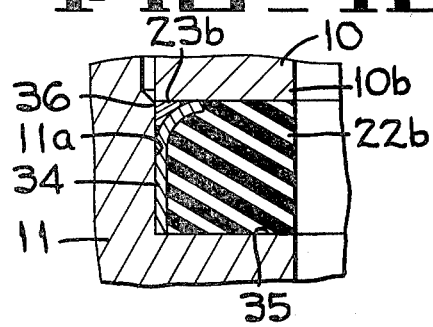
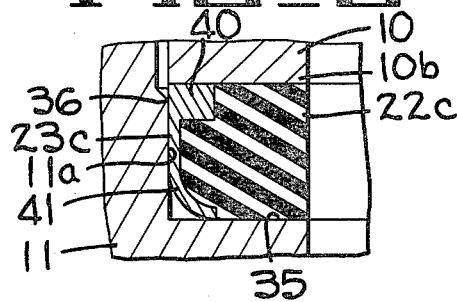
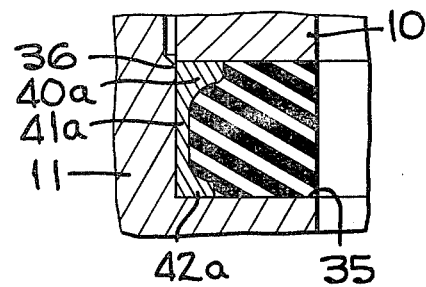
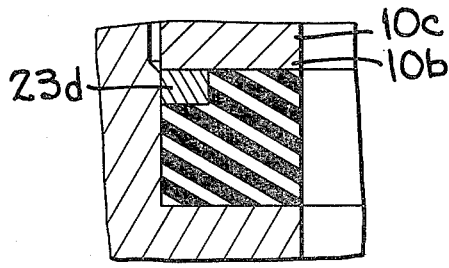
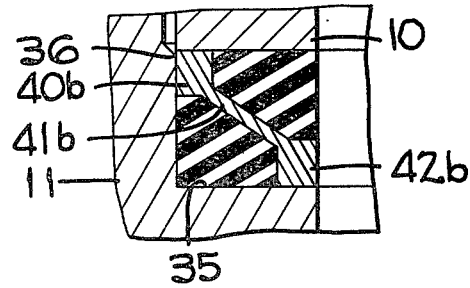
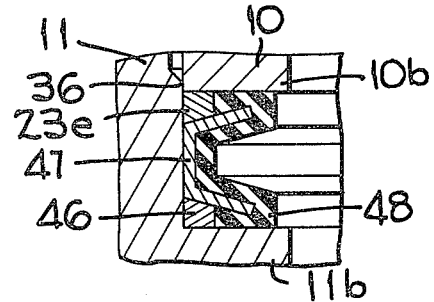

FIRE-SAFE SEAL FOR SWIVEL JOINT

BACKGROUND OF THE INVENTION

1. Field of the Invention

This invention relates to pipe swivel joints, and more particularly, to such swivel joints for use in both normal and relatively high temperature environments.

2. Description of the Prior Art

Pipe swivel joints are commonly used by the oil and gas industry for interconnecting lengths of metal pipes to form an articulated flow conduit between two locations. Such swivel joints commonly have a generally annular inner body member having a bore extending axially therethrough and an annular outer body member surrounding the inner body member. The inner and outer body members are rotatably interconnected by a plurality of ball bearings and one or more annular sealing members mounted at a junction of the inner and outer members prevent leakage of fluid from the swivel joint. Swivel joints used at moderate temperatures commonly use annular resilient sealing members while metal seals are used at higher temperatures. Such metallic seals usually permit more leakage of fluids than do the resilient seals if used at lower temperatures. For this reason when the normal operating temperature is relatively low resilient seals are commonly used. However, in the petroleum industry there is sometimes the danger of a fire either inside the piping itself or outside the piping system in the vicinity of the swivel joint. When fire causes the joint temperature to rise to higher levels, the resilient seal of the swivel joint can deteriorate or be destroyed so that it will no longer be effective as a seal.

Some of the swivel joints use a resilient seal and a metal anti-extrusion ring at the junction of the inner and outer body members to prevent the resilient seal from being extruded into the area between the inner and outer body members. However, if the resilient seal should be destroyed the anti-extrusion ring may move away from the junction of the body members and the swivel joint may have excessive fluid leakage.

SUMMARY OF THE INVENTION

The present invention overcomes some of the disadvantages of the prior art by providing a fire-safe seal for a swivel joint. The swivel joint includes an annular inner element, and an outer element having a radially inward flange extending at one end thereof with the outer elements surrounding the inner element. Bearings mounted between the inner and outer elements rotatably interconnect the inner and outer elements. A resilient annular seal mounted between the outer element flange and the end of the inner element provides a fluid-tight seal at ambient operating temperatures. An anti-extrusion ring, mounted between the resilient seal and a junction of the outer element and the end of the inner element, prevents extrusion of the resilient seal into a space between the junction of the inner and outer elements. A ring retainer biases the anti-extrusion ring against the junction of the inner and outer elements even if the resilient seal should be destroyed, such as by excessively high temperatures. The ring retainer can be a spring having one portion mounted against the flange of the outer element and with another portion of the spring mounted against the anti-extrusion ring to maintain a seal between the inner and outer elements of the swivel joint. Other devices, such as magnetic materials in the anti-extrusion ring and in the inner element to attract the ring toward the inner element can also be used to retain the anti-extrusion ring in position to seal the swivel joint.

BRIEF DESCRIPTION OF THE DRAWINGS

FIG. 1 is a longitudinal section of a pipe swivel joint having a fire-safe seal according to the present invention.

FIG. 2 is an enlarged fragmentary section taken along line 2—2 of FIG. 1 illustrating a portion of the pipe swivel joint.

FIGS. 3-9 disclose other embodiments of the fire-safe seal of the present invention.

DESCRIPTION OF THE PREFERRED EMBODIMENT

A pipe swivel joint J with fire-safe seals according to the present invention (FIG. 1) comprises an annular inner or male element 10, an annular outer or female element 11 surrounding the inner element 10 and a plurality of ball bearings 12 that rotatably interconnect the inner and outer elements 10, 11. The ball bearings 12 each reside in an annular race bearing chamber 16 that is defined by the outer surface 10a of the element 10, the inner surface 11a of the element 11 and by a pair of annular fluid seals 17, 18 between the elements 10, 11. The outer element 11 includes a radially inward extending flange 11b at the lower end of the swivel joint J. The fluid seal 17 is mounted between the inner element 10 and the upper end of the outer element 11, and the fluid-tight seal 18 is mounted between a lower end 10b of the inner element 10 and the flange 11b. The fluid seal 17 retains lubricant in the race chambers 16 and prevents foreign matter such as dirt, water, etc. from entering the race chamber. The fluid-tight seal 18 prevents fluid in a fluid flow passage 19 from leaking from the flow passage into the race chambers 16.

The fluid-tight seal 18 (FIG. 1) includes an annular resilient seal 22, and an anti-extrusion ring 23 having a plurality of spring-like fingers 24 (FIGS. 1, 2) which are biased into an annular groove 28 in the lower portion of the inner element 10. The anti-extrusion ring 23 prevents the resilient seal 22 from extruding into an area 25 between the inner element 10 and the outer element 11 when pressure in the flow passage 19 is high. The resilient seal 22 is compressed between the flange 11b and the lower end 10b of the inner element to provide a fluid-tight seal between the inner and outer elements. The fingers 24 hold the anti-extrusion ring in the position shown in FIG. 1 even when the resilient seal 22 is destroyed to thereby provide a seal between the lower end 10b of the inner element and the surface 11a of the outer element and prevent the flow of fluid into the area 25 between the elements. The fingers 24 can be replaced by a continuous lip extending around the upper portion of the ring 23 with the lip mounted in the groove 28 of the inner element.

Another embodiment of the present invention (FIG. 3) includes a sloping shoulder 29, on the inner wall 11a of the outer element, for retaining the anti-extrusion ring 23a in position adjacent the lower end 10b of the inner element 10. The ring 23a is spring-biased outwardly toward the inner wall 11a of the outer member with a sloping portion 30 of the ring 23a adjacent the shoulder 29 of the outer element 11. The ring 23a prevents the seal 22a from extruding into the space between the inner and outer members 10, 11 when high pressure fluids are present in the flow passage 19 of the joint J. When the resilient seal 22a is destroyed, the sloping shoulder 29 and the lower end 10b of the inner element retain the ring 23a in the sealing position shown in FIG. 3 so the anti-extrusion ring provides a seal at the junction of the inner and outer elements 10, 11.

A third embodiment of the present invention shown in FIGS. 4A, 4B includes an anti-extrusion ring 23b retained in sealing position by a curved annular spring 34 compressed between the lower end of the inner element 10 and a shoulder 35 on the outer element 11. In the relaxed position shown in FIG. 4A the ring 23b is biased toward a junction 36 of the end 10b of the inner element and the inner surface 11a of the outer element by the resilient seal 22b. In the compressed position shown in FIG. 4B the end 10b is closer to the shoulder 35 so the spring 34 is forced more firmly against the ring 23b, and the ring is biased more firmly against the junction 36 to provide a tight seal even if the resilient seal 22b should be destroyed.

Another embodiment of the present invention shown in FIG. 5 includes a combination spring and anti-extrusion ring 23c having an annular upper ring portion 40 adjacent the junction 36 and a lower spring portion 41 adjacent the shoulder 35 of the outer element. The spring portion 41 presses against the shoulder 35 of the outer element 11 to bias the ring portion 40 firmly against the end 10b of the inner element and against the inner wall 11a of the outer element 11 and provides a tight seal if the resilient seal 22c should be destroyed.

FIGS. 6 and 7 disclose other embodiments of the present invention which includes a combination anti-extrusion ring having an upper ring portion 40a, 40b, an annular lower ring portion 42a, 42b and an interconnecting annular spring portion 41a, 41b. The lower ring portion 42a, 42b mounted against the shoulder 35 of the outer element presses the spring portion upward to bias the upper ring portion against the junction 36 of the inner and outer elements.

Another embodiment of the present invention shown in FIG. 8 includes an anti-extrusion ring 23d having magnetized material therein and an inner element 10c having magnetic materials. The ring 23d is biased against the lower end 10b of the inner element 10c by the magnetic attraction between the materials in the anti-extrusion ring 23d and the magnetic materials in the inner element 10c.

The embodiment of the present invention disclosed in FIG. 9 includes an annular anti-extrusion ring 23e mounted adjacent the lower end 10b of the inner element, an annular metal ring 46 adjacent the flange 11b of the outer element, and an annular trough-shaped spring 47 connected between the rings 46, 23e. The spring 47 is compressed between rings 46, 23e to bias the anti-extrusion ring 23e against the junction 36 of the inner and outer elements 10, 11 when the resilient seal 48 is destroyed. When the resilient seal 48 is intact, seal 48 is pressed between the end 10b of the inner element and the flange 11b of the outer element to provide a fluid-tight seal.

The present invention provides an anti-extrusion ring which prevents the resilient seal from extruding into the space at the junction of the inner and outer elements of a swivel joint, and the same anti-extrusion ring provides a seal at the junction of the inner and outer elements if the resilient seal should be destroyed. The anti-extrusion ring is biased against the junction by a spring or other means to insure a good seal between the junction of the inner and outer elements.

Although the best mode contemplated for carrying out the present invention has been herein shown and described, it will be apparent that modification and variation may be made without departing from what is regarded to be the subject matter of the invention.

What is claimed is:

1. A fire-safe seal for a swivel joint having an annular inner element, an annular outer element surrounding said inner element, said outer element having a radially inward extending flange at one end thereof, and bearing means mounted between said outer element and said inner element, said fire-safe seal comprising:
    a resilient annular seal mounted between said flange on said outer element and an end of said inner element to provide a fluid-tight seal between said inner and said outer elements;
    an anti-extrusion ring mounted between said resilient seal and a junction of said outer element and said end of said inner element;
    an annular groove in said inner element adjacent said end of said inner element; and
    a ring retainer for biasing said anti-extrusion ring against said junction of said outer element and said end of said inner element to retain said anti-extrusion ring in position if said resilient seal should be destroyed, said ring retainer including gripping means connected between said anti-extrusion ring and said annular groove.

2. A fire-safe seal as defined in claim 1 wherein said gripping means includes a plurality of spring-like fingers biased into said annular groove.

3. A fire-safe seal as defined in claim 1 wherein said gripping means includes a lip extending around an end portion of said ring retainer.

* * * * *